US010701945B2

(12) United States Patent
Okoniewska et al.

(10) Patent No.: US 10,701,945 B2
(45) Date of Patent: Jul. 7, 2020

(54) SOFT TEXTURED FOOD COMPOSITION WITH SLOWLY AVAILABLE CARBOHYDRATES

(71) Applicant: Intercontinental Great Brands LLC, East Hanover, NJ (US)

(72) Inventors: Monika Okoniewska, East Hanover, NJ (US); Edward C. Coleman, East Hanover, NJ (US); Edouard Page, Saclay (FR); Lenka Gruntoradova, Saclay (FR)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 523 days.

(21) Appl. No.: 14/775,151

(22) PCT Filed: Mar. 13, 2014

(86) PCT No.: PCT/US2014/026853
§ 371 (c)(1),
(2) Date: Sep. 11, 2015

(87) PCT Pub. No.: WO2014/152037
PCT Pub. Date: Sep. 25, 2014

(65) Prior Publication Data
US 2016/0029646 A1 Feb. 4, 2016

Related U.S. Application Data

(60) Provisional application No. 61/793,433, filed on Mar. 15, 2013.

(51) Int. Cl.
A21D 13/38 (2017.01)
A21D 17/00 (2006.01)
A23L 7/117 (2016.01)
A23L 7/122 (2016.01)
A21D 13/32 (2017.01)

(52) U.S. Cl.
CPC ............. *A21D 13/38* (2017.01); *A21D 13/32* (2017.01); *A21D 17/002* (2013.01); *A23L 7/117* (2016.08); *A23L 7/122* (2016.08); *A23V 2002/00* (2013.01)

(58) Field of Classification Search
CPC ........ A21D 13/00; A21D 13/02; A21D 13/32; A21D 13/38; A23L 7/177; A23L 7/122
USPC ......................................................... 426/89
See application file for complete search history.

(56) References Cited

U.S. PATENT DOCUMENTS

| 4,293,577 A | 10/1981 | Cillario |
| 4,563,363 A | 1/1986 | Yoon |
| 4,623,550 A | 11/1986 | Willard |
| 4,664,921 A * | 5/1987 | Seiden .................. A21D 13/80 |
| | | 426/558 |
| 5,492,710 A | 2/1996 | Seyam |
| 5,573,793 A | 11/1996 | Saintain |
| 6,299,916 B1 * | 10/2001 | Dally ................. A23C 19/0765 |
| | | 426/283 |
| 6,723,358 B1 | 4/2004 | van Lengerich |
| 2003/0008039 A1 | 1/2003 | de Martinville et al. |
| 2003/0161861 A1 * | 8/2003 | Lang ....................... A23L 33/40 |
| | | 424/439 |
| 2003/0170348 A1 * | 9/2003 | Mihalos .................. A23L 7/126 |
| | | 426/93 |
| 2005/0226960 A1 * | 10/2005 | Boice ...................... A23P 20/10 |
| | | 426/72 |
| 2006/0073240 A1 | 4/2006 | David et al. |
| 2007/0292583 A1 | 12/2007 | Haynes et al. |
| 2008/0057157 A1 | 3/2008 | Almeida et al. |
| 2008/0206404 A1 | 8/2008 | Green et al. |
| 2009/0220654 A1 | 9/2009 | Kino et al. |
| 2009/0269446 A1 | 10/2009 | Rabault et al. |
| 2009/0285944 A1 | 11/2009 | Rabault et al. |
| 2011/0293809 A1 | 12/2011 | Petronio et al. |
| 2013/0259978 A1 | 10/2013 | Bouvet et al. |

FOREIGN PATENT DOCUMENTS

| CN | 101558778 | 10/2009 |
| JP | 6153801 | 6/1994 |
| JP | 11318337 | 11/1999 |
| JP | 2003310165 | 11/2003 |
| JP | 2009060811 | 3/2009 |
| WO | WO9918804 A1 | 4/1999 |
| WO | 2010092023 | 8/2010 |
| WO | 2012120155 | 9/2012 |
| WO | 2012120156 | 9/2012 |
| WO | 2012155154 | 11/2012 |
| WO | 2013182564 | 12/2013 |

(Continued)

OTHER PUBLICATIONS

The International Preliminary Report on Patentability for International Application PCT/US2014/0268535, dated Sep. 15, 2015, 8 pages.
The International Search Report for International Application PCT/US2014/026853, dated Jul. 24, 2014, 2 pages.
The Written Opinion for International Application PCT/US2014/026853, dated Jul. 24, 2014, 7 pages.
Corradini, MG et al. Squeezing flow of semi liquid foods between parallel Teflon coated plates Rheologica Acta May 2000, vol. 39, Issue 5; abstract; pp. 453-460 but citing p. 454.
Zhang et al. "Slowly Digestible State of Starch: Mechanism of Slow Digestion Property of Gelatinized Maize Starch", J. Agric. Food Chem. 2008, 56, 4695-4702 (2008).
Australian Government Examination Report No. 1, patent application 2014236614, dated Dec. 8, 2015, 3 pages.

(Continued)

*Primary Examiner* — Jyoti Chawla
(74) *Attorney, Agent, or Firm* — Morgan, Lewis & Bockius LLP

(57) ABSTRACT

In some embodiments, the present invention relates to methods and compositions of to a soft textured product comprising a biscuit and a filler, wherein the biscuit and filler are combined to form a soft textured product having a residual force ratio of greater than about 32 and an SAG of greater than about 12.

29 Claims, No Drawings

(56) References Cited

FOREIGN PATENT DOCUMENTS

WO        2014152037        9/2014

OTHER PUBLICATIONS

Canadian Office Action, Application No. 2895143, dated May 25, 2016, 3 pages.
Canadian Office Action, Application No. 2895143, dated Mar. 7, 2017, 4 pages.
Peoples Republic of China Office Action, Application No. 201480011239.7, dated Jun. 2, 2017, 13 pages.
Peoples Republic of China Office Action, Application No. 201480011239.7, dated Feb. 26, 2018, 10 pages.
Extended European Search Report, Application No. 14769080.4-1358/2967088, dated Oct. 25, 2016, 9 pages.
Japanese Office Action, Application No. 2015-552692, dated Jun. 6, 2016, 8 pages.
United States Patent and Trademark Office, Office Action, U.S. Appl. No. 14/127,578 dated Jun. 25, 2015, 8 pages.
United States Patent and Trademark Office, Office Action, U.S. Appl. No. 14/127,578 dated Dec. 21, 2015, 10 pages.
United States Patent and Trademark Office, Office Action, U.S. Appl. No. 14/127,578 dated Aug. 24, 2016, 13 pages.
United States Patent and Trademark Office, Office Action, U.S. Appl. No. 14/127,578 dated Jan. 12, 2017, 14 pages.
United States Patent and Trademark Office, Office Action, U.S. Appl. No. 14/127,578 dated Jul. 19, 2017, 14 pages.
United States Patent and Trademark Office, Office Action, U.S. Appl. No. 14/127,578 dated Jan. 25, 2018, 14 pages.
Chinese Patent Application No. 201480011239.7, Decision of Rejection, dated Oct. 31, 2018, 8 pages.

\* cited by examiner

SOFT TEXTURED FOOD COMPOSITION WITH SLOWLY AVAILABLE CARBOHYDRATES

CROSS-REFERENCE TO RELATED APPLICATIONS

This application is a U.S. National Stage Entry of International Patent Application No. PCT/US2014/026853, filed Mar. 13, 2014, which in turn claims the benefit of U.S. Provisional Application Ser. No. 61/793,433 filed Mar. 15, 2013, which is are incorporated herein by reference in its their entirety.

BACKGROUND OF THE INVENTION

The higher-moisture dough or batter systems of soft-baked bakery products often present a technical challenge for delivery of high levels of slowly available glucose ("SAG"). Higher content of slowly available glucose has been associated with various health benefits, such as continuous glucose release into the bloodstream, and low or moderate glycemic response which can be associated with sustained energy release. The present invention relates to soft textured food products which are rich in SAG.

BRIEF SUMMARY OF THE INVENTION

According to some embodiments, a soft textured product includes a biscuit and a filler, wherein the biscuit and filler are combined to form a soft textured product having a residual force ratio of greater than about 32 and an SAG of greater than about 12.

In some embodiments, the filler has a water activity of about 0.6 or greater. In some embodiments, the filler has solids content of about 5 wt % or greater.

In certain embodiments, the filler and biscuit are combined in a weight ratio of about 1:2 to about 1:4. The biscuit and filler may be assembled in sandwich form (e.g., by depositing filler on base cake and capping the biscuit with a deposited filler) or the biscuit may be ground and combined with the filler in a bar form.

The soft textured may have a water activity of about 0.4 to about 0.8, and/or an SAG of greater than about 15. In some embodiments, the soft textured product has a residual force ratio of greater than about 35.

According to some embodiments, a method of preparing a soft textured product includes combining a biscuit and a filler, and allowing moisture levels in the biscuit and filler to equilibrate in order to provide a soft textured product having a residual force ratio of greater than about 32 and an SAG of greater than about 12.

DETAILED DESCRIPTION OF THE INVENTION

Methods and compositions of some embodiments of the present invention relate to baked products having a soft texture, which are rich in slowly available glucose, and which are shelf stable for at least 6 months, as described in further detail in the sections below. Slowly available glucose ("SAG") has been associated with numerous health benefits, and food products with SAG are therefore desired by today's consumers. However, preparing products with a soft texture often presents technical challenges for the delivery of high levels of SAG. Such technical challenges may be related to the moisture content of the dough or batter, which can result in a breakdown of the native flour and starch matrix during baking and thereby provide a more rapidly digestible starch component. Generally, in foods with soft textures such as bread or rolls, preservation of ungelatizined starch is not possible because processing conditions dictate complete hydration of the ingredients, and high baking temperatures. This combination of high moisture and high baking temperatures drives starch gelatinization, which lowers SAG in the baked product, thereby making it difficult to provide a soft textured product with high SAG.

SAG, as used herein, is defined and measured according to the Englyst method ("Rapidly Available Glucose in Foods: an In Vitro Measurement that Reflects the Glycaemic Response", Englyst et al., Am. J. Clin. Nutr., 1996 (3), 69(3), 448-454; "Glycaemic Index of Cereal Products Explained by Their Content of Rapidly and Slowly Available Glucose", Englyst et al., Br. J. Nutr., 2003(3), 89(3), 329-340; "Measurement of Rapidly Available Glucose (RAG) in Plant Foods: a Potential In Vitro Predictor of the Glycaemic Response", Englyst et al., Br. J. Nutr., 1996(3), 75(3), 327-337). As described herein, high SAG content may be driven by a presence of ungelatinized starch, especially wheat or corn starches. By following special manufacturing conditions, starch gelatinization may be prevented to prepare foods that are rich in SAG. For instance, limiting moisture content in foods during processes such as baking, and carefully controlling baking conditions, i.e., time and temperature, can result in higher levels of ungelatinized starch in the baked product. Examples of methods for making baked products with high SAG are disclosed in PCT/US12/43303, filed on Jun. 20, 2012, which is hereby incorporated by reference.

For example, a specially formulated, low-moisture dough may be rotary molded and baked under specifically controlled conditions to prepare a biscuit rich in SAG. However, a biscuit prepared according to some known formulations and processing conditions would generally have a hard, crunchy texture. When the formulation and processing conditions are implemented to be suitable to produce wire cut biscuits having a softer texture, the SAG content may drop significantly.

Methods and compositions of some embodiments of the present invention relate to novel approaches for providing soft textured baked products that are rich in SAG. In some embodiments, the baked products have shelf stability (e.g., substantially retain a desirable texture) of at least 6 months. Specifically, in some embodiments, a high-SAG biscuit is prepared and combined with a moist filler. In some embodiments, the combination of the biscuit and filling includes depositing filling on a biscuit—such as in a sandwich biscuit. In other embodiments, the biscuit is combined with a filler by blending a biscuit and filler together prior to assembly into a finished product. Moisture equilibration between the biscuit and the filler preferably results in a final product with a soft texture without deterioration of the initial (e.g., prior to combining the biscuit and filler) SAG content of the biscuit. This moisture equilibration may be present even where the initial biscuit had a harder texture. These soft-textured, high-SAG products may be prepared according to the compositions and methods described in more detail below.

Biscuits

In some embodiments, methods and compositions of the present invention include a baked biscuit having high levels of SAG. Biscuits may be prepared according to any suitable formulation or method to provide a biscuit with a desirable SAG.

In some embodiments, a biscuit has an SAG of greater than about 12 g per 100 g of biscuit; greater than about 14 g per 100 g of biscuit; greater than about 16 g per 100 g of biscuit; greater than about 18 g per 100 g of biscuit; greater than about 20 g per 100 g of biscuit; greater than about 22 g per 100 g of biscuit; greater than about 24 g per 100 g of biscuit; greater than about 26 g per 100 g of biscuit; greater than about 28 g per 100 g of biscuit; greater than about 30 g per 100 g of biscuit; about 12 g per 100 g of biscuit; about 14 g per 100 g of biscuit; about 16 g per 100 g of biscuit; about 18 g per 100 g of biscuit; about 20 g per 100 g of biscuit; about 22 g per 100 g of biscuit; about 24 g per 100 g of biscuit; about 26 g per 100 g of biscuit; about 28 g per 100 g of biscuit; or about 30 g per 100 g of biscuit.

In order to prepare biscuits with a high SAG, formulations and processing conditions may result in a biscuit with a low water activity ($A_w$). In some embodiments, biscuits of the present invention have a water activity of about 0.36; about 0.34; about 0.32; about 0.30; about 0.28; about 0.26; about 0.24; about 0.22; about 0.20; about 0.18; about 0.16; about 0.14; about 0.12; about 0.10; about 0.08; about 0.06; about 0.04; less than about 0.3; less than about 0.28; less than about 0.26; less than about 0.24; less than about 0.22; less than about 0.20; less than about 0.18; less than about 0.16; less than about 0.14; less than about 0.12; less than about 0.10; less than about 0.08; less than about 0.06; or less than about 0.04.

Likewise, the high SAG biscuits may have a harder texture. In some embodiments, sensory attributes are quantified by measuring hardness in bite intensities, crunchiness, crumbliness, granulometry, fat in mouth intensities, lightness, dryness, shortbread, stickiness, and/or melting perceptions of the cereal product, using a sensory test according to the guidelines ISO 13299:2003 "Sensory analysis—Methodology—General guidance for establishing a sensory profile". Such sensory evaluations and have been shown to be reproducible and discriminating. As used herein, hardness in bite is a primary parameter of texture defined according to guidelines ISO 11036:1994 "Sensory analysis—Methology—Texture profile", evaluated by sensory experts using the technique described in the same guidelines. The intensity of hardness in bite is measured using a unstructured continuous scale from 0 to 60; 0 being labeled 'weak' and 60 being labeled 'intense." Reference products used for such scale in the hardness in bite evaluation were as follows: Croissant de Lune, Balsen as a product with a weak hardness in bite; Veritable Petit Beurre, LU as a product with intermediate hardness in bite; and Bastogne, LU as a product with an intense hardness in bite.

In some embodiments, the biscuits have a hardness in bite intensity of about 21.5 to about 41 about 25 to about 41; about 26 to about 37.8; about 26.4 to about 37.8; about 35 to about 40; about 25 to about 40; about 21.5 to about 40; about 21.5; about 22; about 25; about 26; about 26.4; about 27.3; about 28; about 30; about 31.4; about 32; about 32.1; about 34; about 34.8; about 36; about 37; about 38; about 40; or about 41. In some embodiments, such hardness in bite intensities are measured for a cereal product at a shelf life of between about 2 weeks to about 6 months; at about 1 month and about 5 months; at about 1 month; at about 2 months; at about 3 months, at about 4 months, at about 5 months; or at about 6 months.

In some embodiments, a biscuit may include any suitable whole grain and/or refined flour such as wheat flour, graham flour, oat flour, corn flour, rye flour, barley flour, spelt flour, soft wheat flour, hard wheat flour, durum wheat flour, kamut flour, tapioca flour, sago flour, and legume flours such as garbanzo bean flour.

In some embodiments, a biscuit includes a refined flour in an amount of about 20 wt % to about 95 wt %; about 20 wt % to about 90 wt %; about 20 wt % to about 80 wt % of the biscuit; about 25 wt % to about 75 wt % of the biscuit; about 30 wt % to about 70 wt % of the biscuit; about 35 wt % to about 65 wt % of the biscuit; about 40 wt % to about 60 wt % of the biscuit; about 45 wt % to about 55 wt % of the biscuit; about 20 wt % of the biscuit; about 25 wt % of the biscuit; about 30 wt % of the biscuit; about 35 wt % of the biscuit; about 40 wt % of the biscuit; about 45 wt % of the biscuit; about 50 wt % of the biscuit; about 55 wt % of the biscuit; about 60 wt % of the biscuit; about 65 wt % of the biscuit; about 70 wt % of the biscuit; about 75 wt % of the biscuit; of about 80 wt % of the biscuit.

In some embodiments, a biscuit may include whole grain flour in an amount of about 20 wt % to about 95 wt %; about 20 wt % to about 90 wt %; about 20 wt % to about 80 wt % of the biscuit; about 25 wt % to about 75 wt % of the biscuit; about 30 wt % to about 70 wt % of the biscuit; about 35 wt % to about 65 wt % of the biscuit; about 40 wt % to about 60 wt % of the biscuit; about 45 wt % to about 55 wt % of the biscuit; about 20 wt % of the biscuit; about 25 wt % of the biscuit; about 30 wt % of the biscuit; about 35 wt % of the biscuit; about 40 wt % of the biscuit; about 45 wt % of the biscuit; about 50 wt % of the biscuit; about 55 wt % of the biscuit; about 60 wt % of the biscuit; about 65 wt % of the biscuit; about 70 wt % of the biscuit; about 75 wt % of the biscuit; of about 80 wt % of the biscuit.

In some embodiments, a biscuit includes flakes, whole grains, seeds, grain cuts, seed cuts, pieces, grits, or combinations thereof. Flakes may be formed from any suitable grain, including wheat, rye, oats, barley, spelt, kamut, durum wheat and combinations thereof or from any suitable legume such as garbanzo bean flakes or corn tapioca or sago flakes.

In some embodiments, a biscuit includes flakes in an amount of about 0.1 wt % to about 50 wt % of the biscuit; about 0.5 wt % to about 40 wt % of the biscuit; about 1 wt % to about 35 wt % of the biscuit; about 5 wt % to about 30 wt % of the biscuit; about 10 wt % to about 20 wt % of the biscuit; about 0.1 wt % of the biscuit; about 1 wt % of the biscuit; about 5 wt % of the biscuit; about 10 wt % of the biscuit; about 15 wt % of the biscuit; about 20 wt % of the biscuit; about 25 wt % of the biscuit; about 30 wt % of the biscuit; about 35 wt % of the biscuit; or about 40 wt % of the biscuit.

Water may be added to the biscuit formulations in an amount suitable to achieve the desired moisture levels in the biscuit. In some embodiments, it is desirable to use a minimal amount of water in a biscuit formulation. In some embodiments, using lower amounts of water may result in lower levels of starch gelatinization, and therefore higher SAG levels in the finished product. In some embodiments, the amount of water included in a formulation is determined by the amount necessary to provide suitable dough rheology for processing and moistness in the final product. In some embodiments, water may be replaced by solvents and/or plasticizers that may mimic water behaving during processing. Examples of suitable water replacements may include propylene glycol and/or ethyl alcohol.

Water may be added to a dough in an amount about 1 wt % to about 10 wt % of the dough; about 1 wt % to about 7 wt % of the dough; about 3 wt % to about 7 wt % of the dough; about 2 wt % to about 6 wt % of the dough; about 3 wt % to about 8 wt % of the dough; about 1 wt % of the dough; about 2 wt % of the dough; about 3 wt % of the dough; about 4 wt % of the dough; about 5 wt % of the dough; about 6 wt % of the dough; about 7 wt % of the dough; about 8 wt % of the dough; about 9 wt % of the dough; or about 10 wt % of the dough.

Biscuits of the present invention may also include protein. Suitable sources of protein may include but are not limited to high protein wheat flour or flakes such as durum wheat or kamut flours or flakes, legume flours or flakes such as garbanzo bean flour or flakes, soybean flour or flakes, whey protein concentrate or isolate, or soybean concentrate or isolate.

In some embodiments, a biscuit may include protein in an amount of about 0.1 wt % to about 30 wt % of the biscuit; about 0.1 wt % to about 25 wt % of the biscuit; about 0.1 wt % to about 20 wt % of the biscuit; about 1 wt % to about 15 wt % of the biscuit; about 1 wt % to about 10 wt % of the biscuit; about 0.1 wt % of the biscuit; about 1 wt % of the biscuit; about 5 wt % of the biscuit; about 10 wt % of the biscuit; about 15 wt % of the biscuit; about 20 wt % of the biscuit; or about 35 wt % of the biscuit.

Biscuits of the present invention may include fat in desired amounts. Fat may be added to the biscuit from any suitable source, including but not limited to shortenings and oils. In some embodiments, a biscuit includes canola oil, high oleic canola oil, palm oil, soybean oil, sunflower oil, sufflower oil, cottonseed oil, hydrogenated oils, transesterified oils or combinations of thereof. The choice of the oil may depend on desired textural and nutritional properties of the biscuit.

In some embodiments, a biscuit may include fat in an amount of about 0.1 wt % to about 30 wt % of the biscuit; about 0.1 wt % to about 25 wt % of the biscuit; about 0.1 wt % to about 20 wt % of the biscuit; about 1 wt % to about 15 wt % of the biscuit; about 1 wt % to about 10 wt % of the biscuit; about 0.1 wt % of the biscuit; about 1 wt % of the biscuit; about 5 wt % of the biscuit; about 10 wt % of the biscuit; about 15 wt % of the biscuit; about 20 wt % of the biscuit; or about 35 wt % of the biscuit.

Biscuits of the present invention may include suitable inclusions. Inclusions may provide textural, aesthetic, as well as nutritional benefits. In biscuits of some embodiments of the present invention, an inclusion is understood to be a component of the biscuit that does not become part of the gluten or dough matrix. In some embodiments, a biscuit may contain inclusions such as fruit, grains, oats, rye, barley, wheat, spelt, kamut, chocolate chips, any other suitable inclusion, or combinations thereof. Suitable fruits may include but are not limited to blueberries, strawberries, raspberries, bananas, peaches, and the like, or combinations thereof. Inclusions may take the form of flakes, grits, cuts, flour, powder, shreds, clusters, grain pieces, or combinations thereof.

Biscuits of some embodiments may also include ingredients such as emulsifiers, buffering agents, leavening agents, seasoning, preservatives and sweeteners.

Suitable emulsifiers may include but are not limited to lecithin, diacetyl tartaric ester of monoglyceride ("DATEM"), mono or diglycerides, phospholipids, caseinate, egg whites, sodium stearoyl lactylate and combinations thereof.

Suitable leavening agents may include but are not limited to ammonium bicarbonate, sodium bicarbonate, sodium acid pyrophosphate or mixtures thereof. In one embodiment, a biscuit includes a combination of ammonium bicarbonate, sodium bicarbonate, and sodium acid pyrophosphate.

Additional ingredients may include vitamins or minerals such as vitamin B1, B2, B3, B6, B12, iron, magnesium, calcium or mixtures thereof. Biscuits may also include salt, flavoring agents such as vanilla, cocoa powder, milk and dairy derivatives, honey.

Biscuits of the present invention may be prepared using any suitable baking methods. In some embodiments, baking conditions are chosen to obtain a target water content. In some embodiments, baking conditions are chosen to obtain a target water content of 0.1% to 5%. In a preferred embodiment, baking conditions are chosen to obtain a target water content of 0.5% to 2.5%. In some embodiments, baking conditions include a baking time of 3 to 15 minutes. In some embodiments, baking conditions include a baking time of 5 to 10 minutes. In a preferred embodiment, baking conditions include a baking time of 6 to 8 minutes. In some embodiments, baking conditions include a baking temperature of 140 to 180° C. In a preferred embodiment, baking conditions include a baking temperature of 150 to 170° C.

In some embodiments, biscuits of the present invention may be prepared according to conditions suitable for achieving the desired levels of SAG in the finished biscuit. In some embodiments, higher SAG content is achieved by using low shear processing conditions. In some embodiments, processing conditions are chosen to minimize damage to the starch in the baked product formulation.

In some embodiments, ingredients are mixed to prepare a dough. In certain embodiments, ingredients are mixed at low speeds, for example in a double arm mixer, in order to prevent damage to the starch in the formulation. In some embodiments, ingredients of a baked product formulation are mixed in an order which may help maintain a higher SAG content in the baked biscuit. For example, in some embodiments, water is mixed with fats, sweeteners and emulsifiers to create an emulsion before mixing in the grains of the formulations, such as flour or flakes. Creation of an emulsion before adding the grains may coat the grains with fats from the emulsion, thereby creating a barrier against water and helping to minimize uniform hydration during forming and gelatinization during baking the biscuit.

In some embodiments, the dough is then rotary moulded, pan moulded, sheeted, or wire cut to prepare dough pieces. The pieces may be transferred to the belt conveyer and further to the oven for baking.

The formed dough pieces may then be baked. In some embodiments, a biscuit is baked to a desired moisture content. In some embodiments, a baked product has a moisture content of about 0.5 wt % to about 5 wt % of the product; about 1 wt % to about 4 wt % of the product; about 1.5 wt % to about 3 wt % of the product; about 0.5 wt % of the product; about 1 wt % of the product; about 1.5 wt % of the product; about 2 wt % of the product; about 2.5 wt % of the product; about 3 wt % of the product; about 3.5 wt % of the product; about 4 wt % of the product; about 4.5 wt % of the product; or about 5 wt % of the product.

Filler

Biscuits of the present invention may be combined with a high moisture filler. The moisture from the filler migrates to the biscuit, resulting in a desired soft texture. To provide this effect, the filler of the present invention may be formulated to provide a sufficient moisture content to enable the desired moisture equilibration with the biscuit, and to thereby result in a soft texture of the final product. Any suitable filler may be included, such as sweet or savory fillers. In some embodiments, the filler is water-based, fat-based, or sugar-based.

The filler may be formulated to have a sufficient water activity to enable the moisture equilibration to create a soft textured product. In some embodiments, the filler has a water activity of about 0.4; about 0.5; about 0.6; about 0.7; about 0.8; about 0.9; about 0.4 to about 0.8; or about 0.5 to about 0.7.

In some embodiments, the filler has a water content of about 1 wt % to about 99 wt %, about 1 wt % to about 90 wt %, about 1 wt % to about 80 wt %, about 1 wt % to about 70 wt %, about 1 wt % to about 60 wt %, about 1 wt % to about 50 wt %, about 1 wt % to about 40 wt %, about 1 wt % to about 30 wt %, about 1 wt % to about 20 wt %, about 1 wt % to about 10 wt; about 2 wt % to about 8 wt %; about 2 wt % to about 6 wt %; about 2 wt % to about 4 wt %; about 1 wt %; about 2 wt %; about 3 wt %; about 4 wt %; about 5 wt %; about 6 wt %; about 7 wt %; about 8 wt %; about 9 w %; about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 25 wt %, about 30 wt %, about 35 wt %, about 40 wt %, about 45 wt %, or about 50 wt %.

In some embodiments, the filler can include fats and/or oils. In some embodiments, the filler has a fat or oil content of about 1 wt % to about 20 wt %, about 1 wt % to about 15 wt %, about 5 wt % to about 15 wt %, about 8 wt % to about 12 wt %; about 1 wt %; about 2 wt %; about 3 wt %; about 4 wt %; about 5 wt %; about 6 wt %; about 7 wt %; about 8 wt %; about 9 w %; about 10 wt %, about 11 wt %, about 12 wt %, about 13 wt %, about 14 wt %, about 15 wt %, about 16 wt %, about 17 wt %, about 18 wt %, about 19 wt %, or about 20 wt %.

In some embodiments, a suitable filler includes softening agents such as but not limited to fat, glycerin, alcohol, fiber such as liquid inulin, and sugar syrups. In some embodiments, the amount of sugar in the filler affects moisture transfer from the filler to the biscuit portion of the product. In some embodiments, the filler includes sugar in an amount of about 25 wt % to about 90 wt %; about 35 wt % to about 85 wt %; about 40 wt % to about 80 wt %; about 45 wt % to about 75 wt %; about 50 wt % to about 80 wt %; about 55 wt % to about 75 wt %; about 60 wt % to about 70 wt %; about 25 wt %; about 30 wt %; about 35 wt %; about 40 wt %; about 45 wt %; about 50 wt %; about 55 wt %; about 60 wt %; about 65 wt %; about 70 wt %; about 75 wt %; about 80 wt % about 85 wt %; or about 90 wt %.

In some embodiments, a filler includes alcohol in an amount of about 0.05 wt % to about 10 wt % of the filler; about 0.1 wt % to about 8 wt % of the filler; about 0.5 wt % to about 6 wt % of the filler; about 1 wt % to about 5 wt % of the filler; about 1.5 wt % to about 4 wt % of the filler; about 2 wt % to about 3 wt % of the filler; about 0.05 wt % of the filler; about 0.1 wt % of the filler; about 0.5 wt % of the filler; about 1 wt % of the filler; about 1.5 wt % of the filler; about 2 wt % of the filler; about 2.5 wt % of the filler; about 3 wt % of the filler; about 4 wt % of the filler; about 5 wt % of the filler; about 6 wt % of the filler; about 7 wt % of the filler; about 8 wt % of the filler; about 9 wt % of the filler; or about 10 wt % of the filler.

In some embodiments, a filler includes inulin in an amount of about 1 wt % to about 10 wt % of the filler; about 1 wt % to about 8 wt % of the filler; about 2 wt % to about 7 wt % of the filler; about 3 wt % to about 6 wt % of the filler; about 1 wt % of the filler; about 2 wt % of the filler; about 3 wt % of the filler; about 4 wt % of the filler; about 5 wt % of the filler; about 6 wt % of the filler; about 7 wt % of the filler; about 8 wt % of the filler; about 9 wt % of the filler; or about 10 wt % of the filler.

In some embodiments, a filler includes glycerin in an amount of about 1 wt % to about 50 wt % of the filler; about 1 wt % to about 45 wt % of the filler; about 1 wt % to about 40 wt % of the filler; about 1 wt % to about 35 wt % of the filler; about 1 wt % to about 30 wt % of the filler; about 2 wt % to about 28 wt % of the filler; about 4 wt % to about 26 wt % of the filler; about 6 wt % to about 24 wt % of the filler; about 8 wt % to about 22 wt % of the filler; about 10 wt % to about 20 wt % of the filler; about 12 wt % to about 18 wt % of the filler; about 14 wt % to about 16 wt % of the filler; about 1 wt % of the filler; about 2 wt % of the filler; about 4 wt % of the filler; about 6 wt % of the filler; about 8 wt % of the filler; about 10 wt % of the filler; about 12 wt % of the filler; about 14 wt % of the filler; about 15 wt % of the filler; about 16 wt % of the filler; about 18 wt % of the filler; about 20 wt % of the filler; about 22 wt % of the filler; about 24 wt % of the filler; about 26 wt % of the filler; about 28 wt % of the filler; about 30 wt % of the filler; about 35 wt % of the filler; about 40 wt % of the filler; about 45 wt % of the filler; or about 50 wt % of the filler. In some embodiments, humectants such as glycerin may be minimized as they may bind water and make it less available for migration.

In some embodiments, a filler includes a syrup. In some embodiments, a filler includes a syrup selected from high fructose corn syrup (42% degree of conversion), high fructose corn syrup (90% degree of conversion), 62 dextrose equivalent (DE) corn syrup, 42 DE corn syrup, total invert syrup, medium invert syrup, wheat glucose-fructose syrup, high maltose syrup, brown rice syrup, honey, inulin syrup, corn fiber syrup, or combinations thereof. Or any other suitable syrup or their combinations.

In some embodiments, a filler is blended with flour such as wheat flour, which may further enhance the SAG of the final product. In some embodiments, a filler contains flour in an amount of about 0.05 wt % to about 10 wt % of the filler; about 0.1 wt % to about 8 wt % of the filler; about 0.5 wt % to about 6 wt % of the filler; about 1 wt % to about 5 wt % of the filler; about 1.5 wt % to about 4 wt % of the filler; about 2 wt % to about 3 wt % of the filler; about 0.05 wt % of the filler; about 0.1 wt % of the filler; about 0.5 wt % of the filler; about 1 wt % of the filler; about 1.5 wt % of the filler; about 2 wt % of the filler; about 2.5 wt % of the filler; about 3 wt % of the filler; about 4 wt % of the filler; about 5 wt % of the filler; about 6 wt % of the filler; about 7 wt % of the filler; about 8 wt % of the filler; about 9 wt % of the filler; or about 10 wt % of the filler.

In some embodiments, a filler is blended with ground biscuits, such as the biscuits described above, to create a blended filler. In some embodiments, a blended filler contains ground biscuits in an amount of about 30 wt % to about 80 wt % of the filler; about 35 wt % to about 75 wt % of the filler; about 40 wt % to about 70 wt % of the filler; about 45 wt % to about 65 wt % of the filler; about 50 wt % to about 60 wt % of the filler; about 35 wt % of the filler; about 40 wt % of the filler; about 45 wt % of the filler; about 50 wt % of the filler; about 55 wt % of the filler; about 60 wt % of the filler; about 65 wt % of the filler; about 70 wt % of the filler; about 75 wt % of the filler; or about 80 wt % of the filler.

In some embodiments, the filler is water. In some embodiments, the filler includes solids. In some embodiments, the amount of solids in the filler may have an impact on water migration to the biscuit. In some embodiments, a filler has a solids content of about 0.01 wt % or greater, about 0.02 wt % or greater, about 0.05 wt % or greater, about 0.1 wt % or greater, about 0.2 wt % or greater, about 0.3 wt % or greater, about 0.4 wt % or greater, about 0.5 wt % or greater, about 0.6 wt % or greater, about 0.7 wt % or greater, about 0.8 wt % or greater, about 0.9 wt % or greater, about 1 wt % or greater; about 2 wt % or greater; about 3 wt % or greater; about 4 wt % or greater; about 5 wt % or greater; about 6 wt % or greater; about 7 wt % or greater; about 8 wt % or greater; about 9 wt % or greater; about 10 wt % or greater; about 15 wt % or greater; about 0.01 wt %, about 0.05 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %; about 2 wt %; about 3 wt %; about 4 wt %; about 5 wt %; about 6 wt %; about 7 wt %; about 8 wt %; about 9 wt %; about 10 wt %; about 15 wt %; about 1 wt % to about 15 wt %; about 2 wt %; to about 14 wt %; about 3 wt % to about 13 wt %; about 4 wt % to about 12 wt %; about 5 wt % to about 11 wt %; or about 6 wt % to about 10 wt %.

Soft-Textured High-SAG Product

In some embodiments, soft textured high-SAG foods may be prepared by combining a biscuit as described herein with a high water activity filler. The filler may be added to the biscuit in any suitable manner. In some embodiments, soft textured high-SAG food may be prepared in the form of a sandwich with the filler adhering the two biscuits together, or as a glazed biscuit with a filler on one surface of the biscuit. In some embodiments, a soft textured high-SAG food may be prepared in the form of a bar, where the biscuits are flaked or ground and the filler acts a binder to hold the biscuit pieces together.

In some embodiments, the filler and biscuit are combined in a weight ratio of about 1:1 to about 1:8: about 1:1 to about 1:6; about 1:1.5 to about 1:5; about 1:2 to about 1:5; about 1:2 to about 1:4; about 1:1; about 1:1.5; about 1:2: about 1:2.5: about 1:3; about 1:4; about 1:5; about 1:6; about 1:7; or about 1:8. In some embodiments, the ratio of filler to biscuit is selected to provide the desired moisture migration from the filler to the biscuit.

To prepare a sandwich or glazed biscuit, biscuits may be prepared as described above. The filler may then be applied to a biscuit as a glaze or as a filler between two biscuits to create a sandwich. In some embodiments, the biscuits have a lower water activity than the filler, and moisture equilibration takes place after combining the filler and the biscuit. The equilibration may produce moisture migration from the filler to the biscuit, resulting in the soft texture of the final product without deterioration of the initial SAG content of the cookie. In some embodiments, SAG may even increase due to higher water levels enabling additional alignment/re-alignment of amylopectin and/or amylose.

Another approach to produce a soft textured high SAG food product is combination of biscuits that are flaked or ground and mixed with a filler that holds the particulates together, providing a soft texture bar type of product. In some embodiments, these bars include biscuits with high SAG content, flours, starches, heat moisture treated flours or starches, flakes, grains, seeds, or combinations thereof. Ingredients of the bar may be selected based on their SAG content and on particle size/granulation to provide a product with high SAG, a soft texture, and any other sensory characteristics that are desired for the bar product. For example, in some embodiments, the level of particle size reduction, e.g., grinding, of the biscuits and any flakes or grains or seeds will depend on the desired texture of the final product.

In some embodiments, the sandwich and bar embodiments described above may be combined. For example, a sandwich product may be prepared by placing filler between two bars made from ground biscuit bound by filler. In another example, ground biscuits may be surrounded by a filler. A selection of the product form may depend on desired texture of the final product and desired SAG content. Additionally, in some embodiments, density of the final product may be reduced by aerating the compositions to soften the final texture and provide a lighter texture.

Water activity may correlate with the softness of the product. In some embodiments, the soft textured high-SAG product has a water activity that avoids crispiness or crunchiness. In some embodiments, the soft textured high-SAG product has a water activity of about 0.2 to about 1; about 0.3 to about 0.9; about 0.4 to about 0.8; about 0.5 to about 0.7; greater than about 0.2; greater than about 0.3; greater than about 0.4; greater than about 0.5; greater than about 0.6; greater than about 0.7; greater than about 0.8; greater than about 0.9; greater than about 1; about 0.2; about 0.3; about 0.4; about 0.5; about 0.6; about 0.7; about 0.8; about 0.9; or about 1. In some embodiments, water is added to the filler before combination with the biscuit. In some embodiments, water is applied to the biscuit. In some embodiments, water is applied to the product after the biscuit and filler have been combined.

In some embodiments, characteristics of the biscuits of the present invention, such as a porous nature, may enable the biscuits to quickly accept moisture from the filler. In some embodiments, biscuits of the present invention absorb moisture from the filler and the product equilibrates in about 1 day from production; about 5 days from production; about 1 week from production; or about 2 weeks from production.

In some embodiments, the soft textured high-SAG products surprisingly maintain a pleasant, chewy texture and maintain their integrity even at the high water activities described herein, rather than degrading or becoming crumbly or mushy. In some embodiments, the soft textured high-SAG products demonstrate a high level of cohesiveness, which prevents the product from having a crumbly or mushy texture.

In some embodiments, the integrity or cohesiveness of a product such as the soft textured high-SAG products is evaluated using an instrument-based textural analysis method. This analysis may be carried out using a Stable Micro Systems (SMS) TAXT Plus texture analyzer with temperature control using the Exponent software (Texture Technologies Corp., Hamilton, Mass.). To conduct the evaluation, the product may be cut evenly into three sections along the width dimension. Each section may then be placed on a roughened flat aluminum plate inside a temperature controlled cabinet mounted on the texture analyzer and set at 25° C. A 1-inch diameter cylindrical probe with roughened bottom surface compresses the sample at a constant speed of 0.5 mm/sec until a distance of 30% of the initial sample thickness is reached. The probe is then held at this position for 15 seconds. During the compression and hold, the force the probe experiences is recorded at 200 scans per second. The force-distance-time data are then analyzed. The maximum force during the compression is reported as the peak force and it is a measure of the sample hardness. During the 15 second hold period, the force decays as the molecules of product relax. The ratio of the force recorded at the end of the hold period to that recorded at the beginning of the hold period is reported as the residual force ratio. The residual force ratio may be an indicator of crumbliness or cohesiveness of the product. A higher residual force ratio indicates a more cohesive, or less crumbly, texture of the product.

In some embodiments, a soft textured product of the present invention has a residual force ratio of greater than about 32; greater than about 33; greater than about 34;

greater than about 35; greater than about 36; greater than about 37; greater than about 38; greater than about 39; greater than about 40; greater than about 41; greater than about 42; greater than about 43; greater than about 44; greater than about 45; greater than about 46; greater than about 47; greater than about 48; greater than about 49; greater than about 50; about 32 to about 56; about 34 to about 54; about 36 to about 52; about 38 to about 50; about 40 to about 48; about 42 to about 46; about 35 to about 42; about 32; about 33; about 34; about 35; about 36; about 37; about 38; about 39; about 40; about 41; about 42; about 43; about 44; about 45; about 46; about 47; about 48; about 49; about 50; about 51; about 52; about 53; about 54; about 55; or about 56.

This prolonged integrity of the soft textured high-SAG products allows for longer shelf life of the product. In some embodiments, the soft textured high-SAG products have a shelf life (e.g., substantially retain a residual force ratio after baking and packaging) of about 2 weeks; about 4 weeks; about 2 months; about 4 months; about 6 months; about 1 year; or about 2 years.

The following examples, wherein all parts, percentages, and ratios are by weight, and all temperatures are in ° F. unless indicated to the contrary, illustrate some embodiments of the present invention:

EXAMPLES

The following biscuit formulation was prepared and used as noted below for Examples 1-4:

Biscuit:

| Ingredients | wt % |
| --- | --- |
| Water | 3.00 |
| Soft Wheat Flour | 20.00 |
| Whole Grain Rye and/or Barley Flours | 8.00 |
| Whole Grain Soft Wheat Flour | 22.00 |
| Sweeteners | 18.00 |
| Fat | 13.00 |
| Dried Fruits | 6.00 |
| Flavoring Agents | 0.50 |
| Multigrain Blend including flakes or oat flakes | 8.00 |
| Leavening Agent | 1.00 |
| Salt | 0.60 |
| Emulsifiers | 0.40 |

The following Strawberry Fruit Filler formulation was prepared and used as noted below for Examples 1-4:

| Ingredient | wt % |
| --- | --- |
| High fructose corn syrup | 40 |
| Sugar | 30 |
| Strawberry puree with fruit pieces | 15-20 |
| Starches | 6-8 |
| Water | <3 |
| Pectin and/or starches | <1 |
| Acidulants and Flavoring Agents | <2 |
| Preservatives | <0.3 |
| Color | <0.2 |

Example 1

Biscuits and fruit filler were prepared according to the formulations above. The fruit filler was then mixed with water before preparing a sandwich, according to the formulation below:

| Ingredients | g | % | $A_w$ | SAG |
| --- | --- | --- | --- | --- |
| Biscuit | 18 | 76.6 | | |
| Strawberry Fruit Filler | 4.5 | 19.1 | | |
| Water | 1 | 4.3 | | |
| TOTAL | 23.5 | 100.0 | 0.544 | 20.6 |

The formulation above depicts a soft sandwich example with an SAG of 20.6%. The biscuits softened as a result of moisture migration from the filler, from an original $A_w$ of 0.26 to 0.55.

Example 2

Biscuits and fruit filler were prepared according to the formulations above. The fruit filler was then mixed with water, inulin, EtOH, and water according to the formulation below. The high SAG biscuits were ground and combined with the filler mixture.

| Ingredients | g | % | $A_w$ | SAG |
| --- | --- | --- | --- | --- |
| Biscuit | 80 | 63.2 | | |
| Strawberry Fruit Filler | 30 | 23.7 | | |
| Inulin | 6.5 | 5.1 | | |
| Ethyl alcohol | 5 | 4.0 | | |
| Water | 5 | 4.0 | | |
| TOTAL | 126.5 | 100.0 | 0.688 | 18.1 |

The formulation above resulted in a soft textured product with an $A_w$ of 0.69 and SAG of 18.1%. One skilled in the art will understand that softness as measured by $A_w$ relative to the starting biscuit can be further improved by adding more water or water containing ingredients Example 3

A product was prepared which represents a combination of the two approaches described in Examples 1 and 2. The biscuits and fruit filler were prepared according to the formulations above. The biscuits were ground and combined with the fruit filler along with inulin according to the formulation below to prepare a blended filler:

| Ingredients | g | % |
| --- | --- | --- |
| Biscuit | 41.0 | 46.9 |
| Strawberry Fruit Filler | 41.0 | 46.9 |
| Inulin | 5.5 | 6.3 |
| TOTAL | 87.5 | 100.0 |

This blended filler was used for sandwiching biscuits according to the formulation below:

| Ingredients | g | % | Aw | SAG |
|---|---|---|---|---|
| Biscuit | 18 | 65.5 | | |
| Blended Filler | 9.5 | 34.5 | | |
| TOTAL | 27.5 | 100.0 | 0.353 | 24.2 |

This sandwich product had an SAG of 24.2% with slightly less softening than in Example 1, as represented by an $A_w$ of 0.35. As above, one skilled in the art will understand that softness as measured by $A_w$ relative to the starting biscuit can be further improved by adding more water or water containing ingredients.

Example 4

The formulation below demonstrates that a soft textured high SAG product can be formulated by preparing a blended filler consisting of fruit filler according to the formulation above, ground biscuits (biscuits according to the formulation above) and softening agents such as water, glycerin, liquid inulin, and ethyl alcohol, and an SAG enhancing ingredient such as wheat flour (SAG 40-44%):

Blended Filler:

| Ingredients | g | wt % |
|---|---|---|
| Biscuit | 100 | 67.0 |
| Strawberry Fruit Filler | 22.5 | 15.1 |
| Inulin | 4.9 | 3.3 |
| Ethyl alcohol | 3.8 | 2.5 |
| Water | 10 | 6.7 |
| Glycerin | 3 | 2.0 |
| Wheat Flour | 5 | 3.4 |
| TOTAL | 149.2 | 100.0 |

Product Formulation:

| Ingredients | g | % | $A_w$ | SAG |
|---|---|---|---|---|
| Biscuit | 18 | 22 | | |
| Blended filler | 60 | 73.2 | | |
| Water | 4 | 4.9 | | |
| TOTAL | 82 | 100 | 0.778 | 21.8 |

According to the Product Formulation above, the blended composition is mixed with water, sheeted, and filled with ground biscuits. The sheet is then folded, and the entire food composition is left to equilibrate. The final food composition was shown to have an $A_w$ of 0.78 and an SAG of 21.8.

Example 5

Biscuits were prepared according to the following formulations:

Biscuit 1:

| Ingredients | wt % |
|---|---|
| Water | 3.00 |
| Soft Wheat Flour | 20.00 |
| Whole Grain Rye and/or Barley Flours | 8.00 |
| Whole Grain Soft Wheat Flour | 22.00 |
| Sweeteners | 18.00 |
| Fat | 13.00 |
| Dried Fruits | 6.00 |
| Flavoring Agents | 0.50 |
| Multigrain Blend including flakes or oat flakes | 8.00 |
| Leavening Agent | 1.00 |
| Salt | 0.60 |
| Emulsifiers | 0.40 |

Biscuit 2:

| Ingredients | wt % |
|---|---|
| Water | 3.00 |
| Soft Wheat Flour | 24.00 |
| Whole Grain Soft Wheat Flour | 8.00 |
| Sweeteners | 18.00 |
| Fat | 13.00 |
| Flavoring Agents | 0.70 |
| Multigrain Blend including flakes or oat flakes | 31.00 |
| Leavening Agent | 1.00 |
| Salt | 0.70 |
| Emulsifiers | 0.40 |

Biscuit 3:

| Ingredients | wt % |
|---|---|
| Water | 3.50 |
| Soft Wheat Flour | 24.00 |
| Whole Grain Soft Wheat Flour | 8.00 |
| Sweeteners | 18.00 |
| Fat | 13.00 |
| Dried Fruits | 6.00 |
| Flavoring Agents | 0.50 |
| Multigrain Blend including flakes or oat flakes | 25.00 |
| Leavening Agent | 1.00 |
| Salt | 0.60 |
| Emulsifiers | 0.40 |

Biscuit 4:

| Ingredients | wt % |
|---|---|
| Water | 2.00 |
| Soft Wheat Flour | 50.00 |
| Whole Grain Rye and/or Barley Flours | 10.00 |
| Skim Milk Powder and Milk Solids | 4.00 |
| Sweeteners | 18.00 |
| Fat | 13.00 |
| Flavoring Agents | 0.70 |
| Leavening Agent | 1.00 |
| Salt | 0.60 |
| Emulsifiers | 0.40 |

Biscuit 5:

| Ingredients | wt % |
|---|---|
| Water | 2.50 |
| Soft Wheat Flour | 30 |
| Whole Grain Rye, Barley and/or Wheat Flours | 10 |
| Milk Solids | 2 |
| Sweeteners | 20 |

-continued

| Ingredients | wt % |
|---|---|
| Fat | 14.00 |
| Cocoa Powder | 4 |
| Flavoring Agents | 1 |
| Chocolate Chips | 14 |
| Leavening Agents | 1.00 |
| Salt | 0.70 |
| Emulsifiers | 0.80 |

Fillers were prepared according to the following formulations:

Blueberry Fruit Filler

| Ingredients | wt % |
|---|---|
| Glucose-fructose syrup | 60 |
| Fruit purees | 40.0 |
| Glycerin | 15.0 |
| Sucrose | 15.0 |
| Acidulants and/or preservatives | <2.0 |
| Fruit pectin and/or starches | <2.0 |
| Flavors | <1.0 |

Lemon Fruit Filler

| Ingredients | wt % |
|---|---|
| Glucose-fructose syrup | 60 |
| Glycerin | 15 |
| Apple and Lemon purees | 20-25 |
| Sweetened egg yolk | 8 |
| Fats and glycerids | 4 |
| Sugar | 4 |
| Concentrated lemon juice | 2 |
| Flour | <1 |
| Acidulants and/or preservatives | <1 |
| Flavors | <1 |
| Pectin and/or starches | <1 |
| Water | 14-24 |
| Total | 100 |

Strawberry Fruit Filler

| Ingredient | wt % |
|---|---|
| High fructose corn syrup | 40 |
| Sugar | 30 |
| Strawberry puree with fruit pieces | 15-20 |
| Starches | 6-8 |
| Water | <3 |
| Pectin and/or starches | <1 |
| Acidulants and Flavoring Agents | <2 |
| Preservatives | <0.3 |
| Color | <0.2 |

Chocolate Filler

| Ingredient | wt % |
|---|---|
| Corn syrups (glucose-fructose syrup) | 25-50 |
| Chocolate | 5-25 |
| Glycerin | 15 |
| Sugar | 5-10 |
| Milk and/or Milk Solids | 10-15 |
| Shortening | 2-8 |
| Water | 15-25 |
| Cocoa Powder | 0.5-5 |
| Pectin and/or starches | <5 |
| Acidulants and/or Flavoring Agents | <2 |
| Preservatives | <0.5 |

Plain Filler

| Ingredient | wt % |
|---|---|
| Sugar | 10-15 |
| Pregelatinized Starch | 5-10 |
| Maltodextrin | 5-10 |
| Water | 40-50 |
| Corn syrup | 20-25 |
| Glycerin | 10-15 |
| Acidulants and/or Flavoring Agents (optional) | <5 |
| Preservatives (optional) | <1 |
| Color (optional) | <1 |

The fillers and biscuits were then combined to prepare sandwich products according to the formulations below:

| Formulation | g | wt % | $A_w$ | SAG |
|---|---|---|---|---|
| 1 | | | | |
| Biscuit 1 | 25.0 | 74.6 | | |
| Strawberry Fruit Filler | 6.0 | 17.9 | | |
| Water | 2.5 | 7.5 | | |
| TOTAL | 33.5 | 100.0 | 0.712 | 16.57 |
| 2 | | | | |
| Biscuit 3 | 25.0 | 74.6 | | |
| Lemon Fruit Filler | 6.0 | 17.9 | | |
| Water | 2.5 | 7.5 | | |
| TOTAL | 33.5 | 100.0 | 0.703 | 15.67 |
| 3 | | | | |
| Biscuit 1 | 25.0 | 74.6 | | |
| Lemon Fruit Filler | 5.5 | 16.4 | | |
| Water | 3.0 | 9.0 | | |
| TOTAL | 33.5 | 100.0 | | 15.7 |
| 4 | | | | |
| Biscuit 3 | 25.0 | 77.4 | | |
| Blueberry Fruit Filler | 5.5 | 17.0 | | |
| Water | 1.8 | 5.6 | | |
| TOTAL | 32.3 | 100 | 0.654 | 14.6 |
| 5 | | | | |
| Biscuit 2 | 25 | 77.4 | | |
| Strawberry Fruit Filler | 5.5 | 17.0 | | |
| Water | 1.8 | 5.6 | | |
| TOTAL | 32.3 | 100.0 | 0.663 | 17.8 |
| 6 | | | | |
| Biscuit 4 | 25 | 74.4 | | |
| Strawberry Fruit Filler | 6 | 17.9 | | |
| Water | 2.6 | 7.7 | 0.694 | |
| TOTAL | 33.6 | 100.0 | | |

-continued

| Formulation | g | wt % | $A_w$ | SAG |
|---|---|---|---|---|
| 7 | | | | |
| Biscuit 2 | 25 | 76.2 | | |
| Blueberry Fruit Filler | 6 | 18.3 | | |
| Water | 1.8 | 5.5 | 1) 0.683 | |
| TOTAL | 32.8 | 100.0 | | |
| 8 | | | | |
| Biscuit 5 | 25 | 76 | | |
| Chocolate Filler | 8 | 24 | | |
| Total | 33 | 100 | 0.70 | 18 |
| 9 | | | | |
| Biscuit 3 | 25 | 76 | | |
| Plain Filler | 8 | 24 | | |
| Total | 33 | 100 | 0.689 | 16.5 |
| 10 | | | | |
| Biscuit 4 | 25 | 76 | | |
| Plain Filler | 8 | 24 | | |
| Total | 33 | 100 | 0.710 | 16.9 |
| 11 | 25 | 76 | 0.699 | 15.4 |
| Biscuit 3 | 8 | 24 | | |
| Plain Filler | 33 | 100 | | |

After the products were prepared, they were tested for the residual force ratio according to the process described in the specification herein. The results are as follows:

| Formulation | Test Position | Residual Force Ratio |
|---|---|---|
| 1 | | |
| Biscuit 1 with Strawberry Fruit Filler | Center | 40.4 |
| Biscuit 1 with Strawberry Fruit Filler | Edge | 41 |
| 2 | | |
| Biscuit 3 with Lemon Fruit Filler | Center | 43.5 |
| Biscuit 3 with Lemon Fruit Filler | Edge | 43.4 |
| 3 | | |
| Biscuit 1 with Lemon Fruit Filler | Center | 34.9 |
| Biscuit 1 with Lemon Fruit Filler | Edge | 36.6 |
| 4 | | |
| Biscuit 2 with Blueberry Fruit Filler | Center | 46.9 |
| Biscuit 2 with Blueberry Fruit Filler | Edge | 45.1 |
| 5 | | |
| Biscuit 3 with Strawberry Fruit Filler | Center | 49.9 |
| Biscuit 3 with Strawberry Fruit Filler | Edge | 49.3 |
| 6 | | |
| Biscuit 4 with Strawberry Fruit Filler | Center | 41.8 |
| Biscuit 4 with Strawberry Fruit Filler | Edge | 42.2 |
| 7 | | |
| Biscuit 3 with Blueberry Fruit Filler at 4-6 weeks | Center | 42.4 |
| Biscuit 3 with Blueberry Fruit Filler at 4-6 weeks | Edge | 43.1 |
| 8 | | |
| Biscuit 3 with Plain Filler | Center | 48 |
| Biscuit 3 with Plain Filler | Edge | 46 |
| 9 | | |
| Biscuit 3 with Blueberry Fruit Filler at 21-25 weeks | Center | 48 |
| Biscuit 3 with Blueberry Fruit Filler at 21-25 weeks | Edge | 46 |

The results above demonstrate that high-SAG products may be prepared that have a soft texture, as the residual force ratios show that the products have a soft texture and cohesive, rather than crumbly, nature.

The results in the examples above demonstrate that a soft textured high-SAG formulation can be accomplished by the approach described above. Water activity can be used as an indicator of the product softness and can be manipulated by the level of water addition or other ingredients such as glycerin and/or alcohol.

It is to be understood that at least some of the descriptions of the invention have been simplified to focus on elements that are relevant for a clear understanding of the invention, while eliminating, for purposes of clarity, other elements that those of ordinary skill in the art will appreciate may also comprise a portion of the invention.

We claim:

1. A soft textured product comprising:
   (a) a baked biscuit having an initial water activity of about 0.36 or less,
   (b) a filler having a sufficient water activity to enable moisture equilibration between the baked biscuit and the filler after combining the baked biscuit and the filler,
   wherein the soft textured product has, after moisture equilibration between the combined baked biscuit and filler, a residual force ratio of greater than about 32, an SAG of greater than about 12, and a water activity of about 0.2 to about 1.

2. The soft textured product of claim 1, wherein the filler has a water activity of about 0.6 or greater.

3. The soft textured product of claim 1, having a water activity of about 0.4 to about 0.8.

4. The soft textured product of claim 1, wherein the baked biscuit and filler are assembled in a sandwich form.

5. The soft textured product of claim 1, wherein the baked biscuit is ground and combined with the filler in a bar form.

6. The soft textured product of claim 1, having an SAG of greater than about 15.

7. The soft textured product of claim 1, having a residual force ratio of greater than about 35.

8. The soft textured product of claim 1, wherein the filler has a solids content of about 0.01 wt % or greater.

9. The soft textured product of claim 1, wherein the filler is water.

10. The soft textured product of claim 1, wherein the filler and baked biscuit are combined in a weight ratio of about 1:2 to about 1:4.

11. The soft textured product of claim 1, wherein the baked biscuit has an SAG of at least 12 g per 100 g of the baked biscuit.

12. The soft textured product of claim 11, wherein the filler has a water activity of about 0.6 or greater.

13. The soft textured product of claim 11, wherein the soft textured product formed by the baked biscuit and the filler has a water activity of greater than about 0.3.

14. The soft textured product of claim 11, wherein the soft textured product formed by the baked biscuit and the filler has a water activity of about 0.4 to about 0.8.

15. The soft textured product of claim 1, wherein:
   the baked biscuit has an SAG of at least 12 g per 100 g of the baked biscuit and an initial water activity of less than about 0.4;
   the filler has a water activity of about 0.6 or greater; and
   the soft textured product formed by the baked biscuit and the filler has a water activity of greater than about 0.3.

16. The soft textured product of claim 1, wherein:
the baked biscuit has an SAG of at least 12 g per 100 g of the baked biscuit and an initial water activity of less than about 0.4;
the filler has a water activity of about 0.6 or greater; and
the soft textured product formed by the baked biscuit and the filler has a water activity of about 0.4 to about 0.8.

17. A method of preparing a soft textured product comprising:
combining a baked biscuit having an initial water activity of about 0.36 or less and a filler having a sufficient water activity to enable moisture equilibration between the baked biscuit and the filler;
wherein, after moisture equilibration between the combined baked biscuit and the filler, the soft textured product has a water activity of about 0.2 to about 1, a residual force ratio of greater than about 32, and an SAG of greater than about 12.

18. The method of claim 17, wherein the filler has a higher water activity than the baked biscuit.

19. The method of claim 17, wherein the filler has a water activity of about 0.6 or greater.

20. The method of claim 17, wherein the baked biscuit and filler are combined in a sandwich form.

21. The method of claim 17, wherein the baked biscuit is ground and combined with the filler in a bar form.

22. The method of claim 17, wherein the soft textured product has an SAG of greater than about 15.

23. The method of claim 17, wherein the soft textured product has a residual force ratio of greater than about 35.

24. The method of claim 17, wherein the moisture levels equilibrate in less than about 1 week.

25. The method of claim 17, wherein the moisture levels equilibrate in less than about 2 days.

26. The method of claim 17, wherein the soft textured product has a water activity of about 0.4 to about 0.8.

27. The method of claim 17, wherein the filler and baked biscuit are combined in a weight ratio of about 1:2 to about 1:4.

28. The method of claim 17, wherein the filler has a solids content of about 0.01 wt % or greater.

29. The method of claim 17, wherein the filler is water.

* * * * *